United States Patent [19]

Kerr

[11] 4,271,821

[45] Jun. 9, 1981

[54] SOLAR ENERGY COLLECTOR

[76] Inventor: Colin C. Kerr, Box 275, Hawkesbury, Ontario, Canada, K6A 2R9

[21] Appl. No.: 176,532

[22] Filed: Aug. 8, 1980

[51] Int. Cl.$^3$ .............................................. F24J 3/02
[52] U.S. Cl. ................................... 126/417; 126/442; 126/444; 126/431; 126/450; 165/147; 165/485
[58] Field of Search .............. 126/417, 432, 428, 442, 126/444, 445, 446, 448, 450, 431; 165/50, 53, 55, 57, 142, 146, 76, 78, 147, 485; 98/40 D, 40 VM, 40 R; 237/69

[56] References Cited

U.S. PATENT DOCUMENTS

| | | | |
|---|---|---|---|
| 2,291,220 | 7/1942 | Germonprez | 98/40 D |
| 2,783,639 | 3/1957 | Werner | 237/69 X |
| 3,202,078 | 8/1965 | Meek et al. | 98/40 D |
| 3,251,289 | 5/1966 | Mariner | 98/40 D |
| 3,527,292 | 9/1970 | Rutherford | 165/147 X |
| 3,675,710 | 7/1972 | Ristsin | 165/147 |
| 3,994,278 | 11/1976 | Pittinger | 126/444 |
| 4,011,858 | 3/1977 | Hurkett | 126/444 |
| 4,069,973 | 1/1978 | Edwards | 237/69 |
| 4,076,013 | 2/1978 | Bette | 126/444 |

Primary Examiner—James C. Young
Assistant Examiner—Larry Jones
Attorney, Agent, or Firm—A. Lebrun

[57] ABSTRACT

A solar energy collector which includes a solar panel with channels for solar energy collecting fluid or liquid which channels are adapted to efficiently use the available panel area and thus more efficiently collect the solar energy per unit area than so far achieved. This solar energy collector comprises a solar panel distinctively including fluid channels tapering in width from an inlet end to an outlet end thereof and laterally juxtaposed such that the channels of one set laterally alternate with the other channels and taper in width in opposite direction relative to these other channels.

4 Claims, 7 Drawing Figures

SOLAR ENERGY COLLECTOR

This invention relates to solar energy collecting hardware, and more particularly, to a solar energy collector of the type involving a fluid or liquid heated by solar radiation.

In the collectors of the above type which have been proposed so far, the liquid channels are of constant cross section and cover substantially less than the effective area of the panel which is exposed to the solar rays. The above incomplete coverage results in incomplete utilization of the available solar energy and therefore a relatively low efficiency of energy collection. Besides, the channels or tubes of constant cross section are found relatively inefficient since at their downstream end little if any further heat can be transferred to the already heated fluid and therefore a substantial amount of incident solar heat is not collected at the downstream end.

It is a general object of the present invention to provide a relatively more efficient solar energy collector, and consequently to enhance the possibility to produce a solar energy collector installation which allows self-sufficiency for a dwelling or house within the available area for solar energy panels.

It is a further object of the present invention to provide a solar energy collector panel wherein substantially the whole exposed area thereof is covered with solar energy collector channels.

It is a further object of the present invention to provide a solar energy collector with liquid channels of appropriate configuration and spatial relationship to efficiently collect the solar energy from the whole effective area of the solar panel.

It is a more specific object of the present invention to provide a solar energy collector with channels of a width tapering toward the downstream end yet maintaining sufficient cross-section to allow full flow to minimize the panel area covered by the less efficient downstream end, and in particular, wherein the tapering channels are arranged side by side and alternatively taper in width in opposite directions to more efficiently cover the whole area of the solar panel.

The above and other objects and advantages of the present invention will be better understood with the following detailed description of a preferred embodiment thereof which is illustrated, by way of example, in the accompanying drawings; in which.

Figure 1:
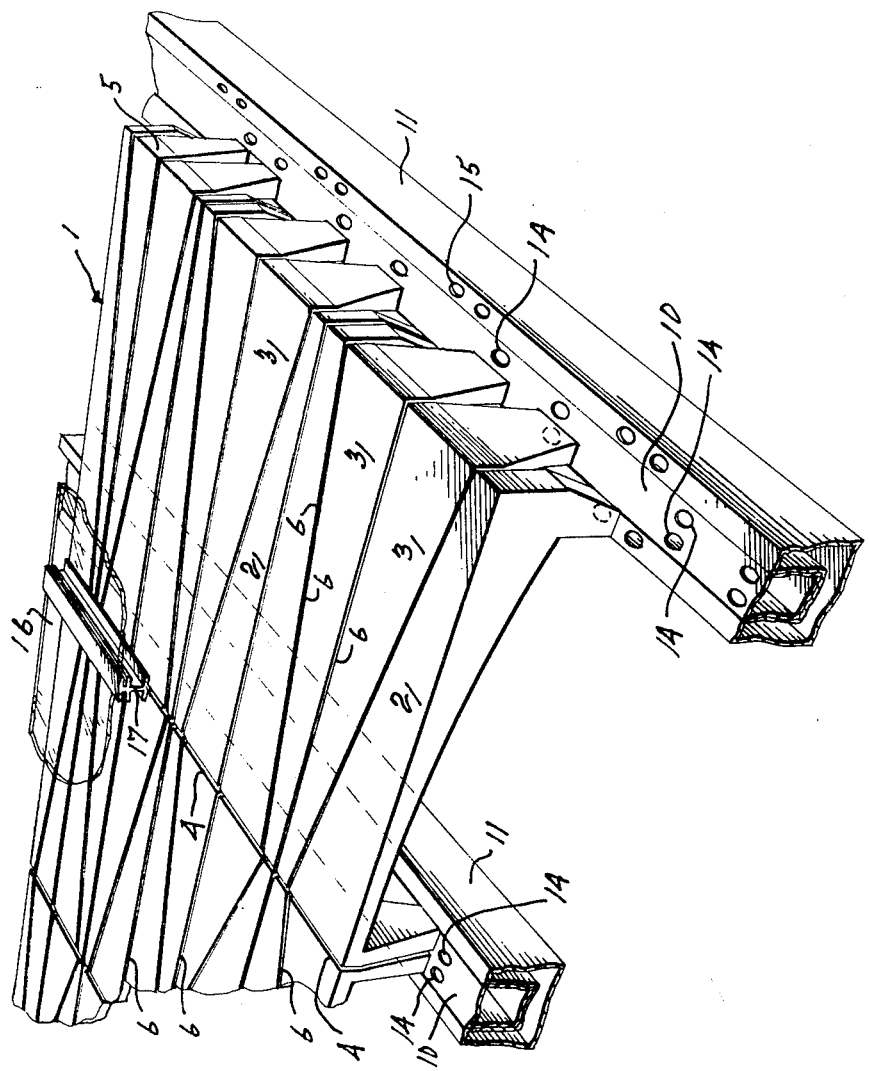
FIG. 1 is a perspective view of a portion of a solar energy collector with parts broken away to define the structural details of one embodiment of the present invention.
Figure 2:
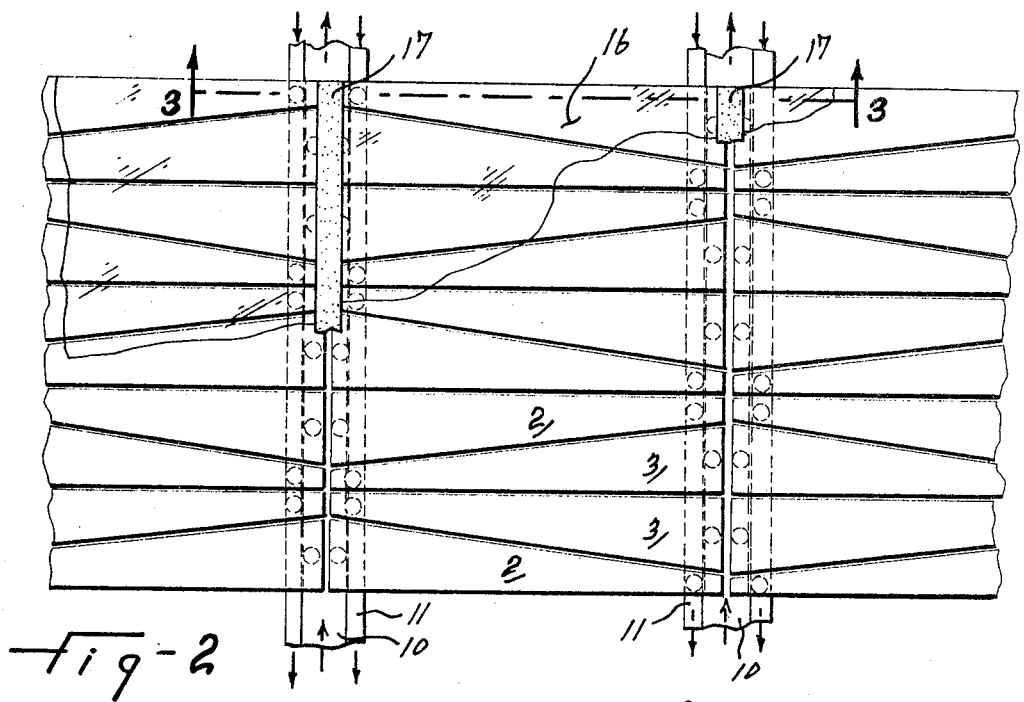
FIG. 2 is a top view of the solar energy collector shown in FIG. 1.

The solar energy collector illustrated in FIGS. 1 to 4 inclusive takes the form of a solar energy collecting panel 1 including a top face absorbent to solar energy and a plurality of solar panel sections or solar energy collecting fluid channel units 2 and 3 arranged in rows defining opposite edges 4 and 5 at the ends of these panel units. Each solar panel section or unit 2 or 3 constitutes a flat top tube forming a shallow channel extending from end to end thereof. Each solar panel section or solar energy collecting fluid channel units 2 and 3 tapers in width from one end to the other such that the width of the shallow channel progressively decreases from the one end to the other end. Each solar panel section has opposite lateral sides 6. Thus, the above width transversely extends between these opposite lateral sides 6. Each solar panel section laterally adjoins another edgewise at one of the opposite lateral sides thereof.

The channel of each solar panel section has an upstream wider end and a downstream narrower end. Each solar panel section or unit 2 and 3 tapers in width such that the opposite lateral sides thereof converge toward each other from the upstream end to the downstream end of the corresponding channel.

Figure 3:
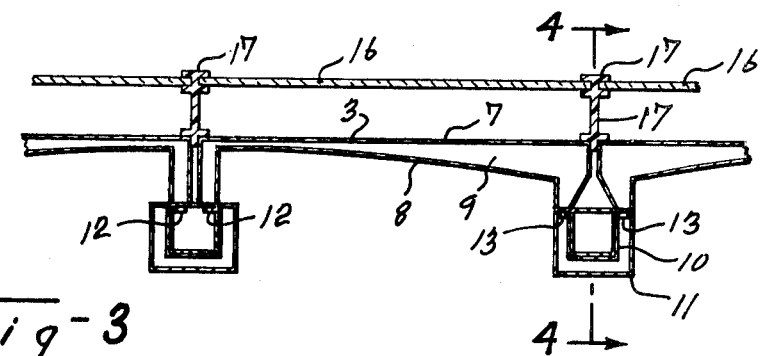
FIG. 3 is a cross-sectional view as seen along line 3—3 in FIG. 2.
Figure 4:
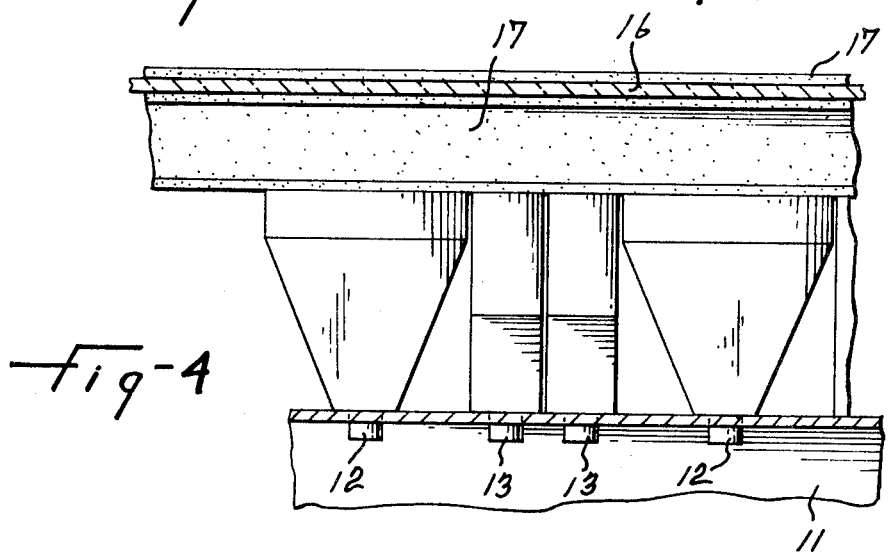
FIG. 4 is a cross-sectional view as seen along line 4—4 in FIG. 3.

It must be noted that the set of solar energy panel sections 2 taper in width in opposite direction relative to the set of solar energy panel sections 3. Each solar panel section or unit has a flat top 7 absorbent to solar energy and a curved bottom 8, as best shown in FIG. 3 laterally extending between the corresponding converging sides 6 and upwardly defining a corresponding fluid channel 9.

Thus, each solar energy panel section or fluid channel unit 2 or 3 and corresponding channel 9 extends from a relatively wide and shallow upstream end to a relatively narrow and deep downstream end. Thus, the cross-section of each panel section or unit correspondingly varies from one end to the other of each unit 2 and 3.

Along each of the aforementioned opposite edges 6 of the solar panel 1 there are positioned both an inlet manifold 10 and an outlet manifold 11. Each solar energy panel section 2 and 3 is provided with a tubular inlet 12 downwardly projecting from the wider upstream end thereof and a tubular outlet 13 downwardly projecting from the narrower downstream end thereof. Each inlet manifold 10 is provided with apertures 14 to tightly insert the tubular inlets 12 therein. Similarly, each outlet manifold 11 is provided with apertures 15 to tightly insert the tubular outlets 13 therein. Thus, each solar energy unit 2 or 3 has a tubular inlet 12 communicating with an inlet manifold 10 and a tubular outlet 13 communicating with an outlet manifold 11 at opposite edges 4 and 5. The solar energy units 2 are arranged in opposite direction relative to the solar energy units 3 such that the wider end of the units 2 are positioned adjacent the narrower end of the units 3 and vice versa.

A protective glass 16 is positioned over the solar energy panel section or unit 2 and 3 in any suitable manner such as by appropriate rails 17 engaged in the spaces at the edges 4 and 5. The rails 17 may have any appropriate cross-section and may be of plastic or metal. There may be more than one layer of glass 16 defining captive air spaces between them. The sheets of glass 16 may be replaced by a glass shell surrounding each unit 2 and 3 individually.

The top face of each solar panel section or unit 2 and 3 may be treated in any appropriate and known manner to enhance heat absorption. This treatment may consist of selective coating for readily absorption of direct shortwave radiation while opposing re-radiation of heat (long-wave emission).

Instead of forming a parallel arrangement as in the embodiment of FIGS. 1 to 4 inclusive, the solar panel units may be radially arranged as here after described with reference to FIGS. 5, 6 and 7.

Figure 5:
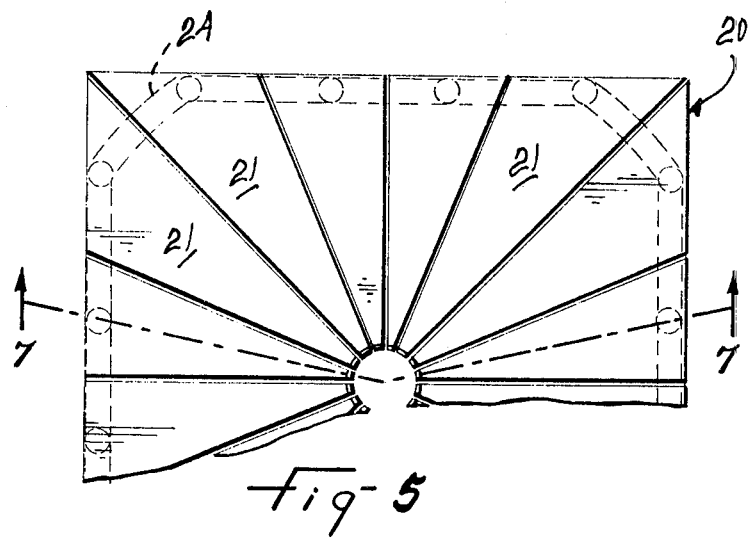
FIG. 5 is a top plan view of a portion of a solar energy collecting panel according to a second embodiment of the present invention.
Figure 7:
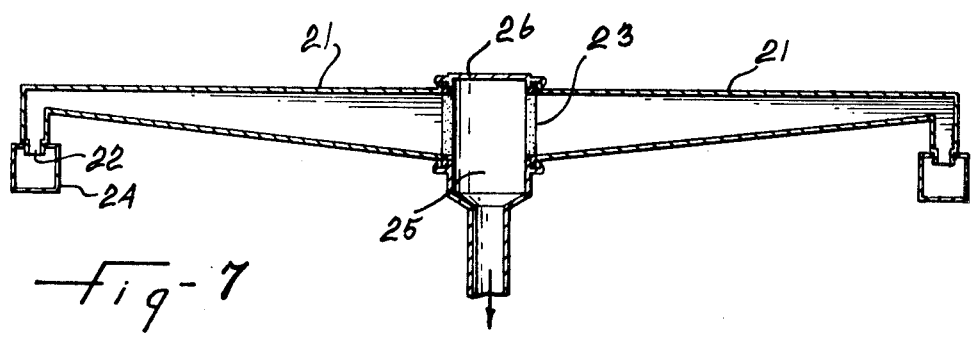
FIG. 7 is a cross-sectional view as seen along line 7—7 in FIG. 5.

In the embodiments of FIGS. 5 and 7, the solar energy collecting panel 20 is rectangular with the solar panel units 21 thereof tapering in width radially inwardly from the outer edge of the panel to a central aperture. Each panel unit 21 has a downwardly projecting tubular inlet 22 at the wider end and has an open narrower end 23 forming an outlet. An inlet manifold 24 extends along the perimeter of the solar panel 20 and is formed with apertures in which are inserted the tubular inlets 22. An outlet tube 25 upwardly extends centrally of the solar panel 20 and is radially connected to the outlet ends 23 thereof by appropriate flanges and seals. The upper end of the outlet tube 25 is closed by a cover 26.

Figure 6:
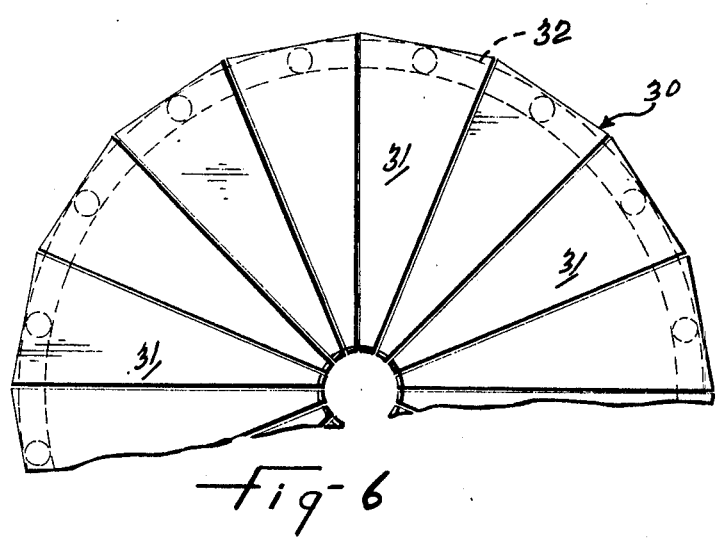
FIG. 6 is a top plan view of a portion of a solar energy collecting panel according to a third embodiment of the present invention.

In the embodiment of FIG. 6, the panel 30 is instead circular, the solar panel units 31 are all alike, and the inlet manifold 32 is also circular but the remainder of the details are as in the embodiment of FIGS. 5 and 7. In fact, FIG. 7 could as well be identified as a cross-section in FIG. 6 since the details in FIG. 7 are also found in the embodiment of FIG. 6.

I claim:

1. A solar energy collector comprising: a panel including a top face and a plurality of solar energy collecting fluid channel units; said top face being absorbent to solar energy and each of said solar energy collecting fluid channel units having a fluid channel with an upstream end and a downstream end, having opposite lateral sides laterally spaced apart across said solar energy absorbent top face, having a solar energy absorbent top extending between the corresponding opposite lateral sides, having a width between said lateral sides decreasing from the corresponding upstream end toward the downstream end, and laterally immediately adjoining and adjacent another of the solar energy collector fluid channel units along one of the opposite lateral sides of each other.

2. A solar energy collector as defined in claim 1, wherein said plurality of solar energy collecting fluid channel units include a first and a second sets of channel units and the channel units of the first set taper in opposite direction relative to the channel units of the second set.

3. A solar energy collector as defined in claim 2, wherein each laterally tapering solar energy collecting fluid channel unit defines a wider inlet end, a narrower outlet end, and a bottom progressively diverging relative to the top from the wider inlet end to the narrower outlet end.

4. A solar energy collector comprising: a panel including a top face and a plurality of solar energy collecting fluid channel units; said top face being absorbent to solar energy and each of said solar energy collecting fluid channel units having a fluid channel with an upstream end and a downstream end, having opposite lateral sides laterally spaced apart across said solar energy absorbent top face, having a solar energy absorbent top extending between the corresponding opposite lateral sides, having a width between said lateral sides decreasing from the corresponding upstream end toward the downstream end, and laterally adjoining another of the solar energy collector fluid channel units along one of the opposite lateral sides of each other, said plurality of solar energy collecting fluid channel units including a first and a second sets of channel units, the channel units of the first set taper in opposite direction relative to the channel units of the second set, each laterally tapering solar energy collecting fluid channel unit defining a wider inlet end, a narrower outlet end, and a bottom progressively diverging relative to the top face from the wider inlet end to the narrower outlet end, one inlet manifold connected to the upstream end of the channel units of said first set, another inlet manifold connected to the upstream end of the channel units of said second set, one outlet manifold connected to the downstream end of the channel units of said second set, another outlet manifold connected to the channel units of said first set, and said one inlet manifold and one outlet manifold being positioned at the opposite end of the solar energy collecting fluid channel units relative to said another inlet manifold and another outlet manifold.

* * * * *